United States Patent
Tsunematsu et al.

(10) Patent No.: US 8,558,501 B2
(45) Date of Patent: Oct. 15, 2013

(54) AIRCRAFT MOTOR DRIVE CONTROL APPARATUS AND AIRCRAFT MOTOR DRIVE CONTROL SYSTEM

(75) Inventors: Tokuji Tsunematsu, Gifu (JP);
Kazushige Nakajima, Gifu (JP);
Hiroyuki Kitazwa, Gifu (JP);
Tomoyuki Yokogawa, Gifu (JP)

(73) Assignee: Nabtesco Corporation, Tokyo (JP)

( * ) Notice: Subject to any disclaimer, the term of this patent is extended or adjusted under 35 U.S.C. 154(b) by 98 days.

(21) Appl. No.: 13/344,219

(22) Filed: Jan. 5, 2012

(65) Prior Publication Data
US 2012/0187892 A1 Jul. 26, 2012

(30) Foreign Application Priority Data
Jan. 20, 2011 (JP) .................................. 2011-009457

(51) Int. Cl.
*H02P 23/00* (2006.01)
*H02P 27/08* (2006.01)

(52) U.S. Cl.
CPC ..................................... *H02P 27/08* (2013.01)
USPC ............ 318/811; 318/721; 318/599; 318/560

(58) Field of Classification Search
CPC ....................................................... H02P 27/08
USPC .................. 318/811, 721, 599, 560
See application file for complete search history.

(56) References Cited

U.S. PATENT DOCUMENTS
5,541,488 A * 7/1996 Bansal et al. ................. 318/801

FOREIGN PATENT DOCUMENTS
JP 2007-046790 A 2/2007
JP 2010-057243 A 3/2010

* cited by examiner

*Primary Examiner* — Bentsu Ro
*Assistant Examiner* — David Luo
(74) *Attorney, Agent, or Firm* — Studebaker & Brackett PC

(57) ABSTRACT

The command signal processing unit outputs, when a first PWM frequency command signal is received, a high-PWM frequency command signal such that an asynchronous PWM control is performed at a PWM frequency of a predetermined constant frequency. The command signal processing unit outputs, when a second PWM frequency command signal is received, a low-PWM frequency command signal such that an asynchronous or synchronous PWM control is performed at a frequency lower than the above-described frequency. The PWM frequency control unit controls the PWM frequency such that an asynchronous PWM control is performed if a motor has a rotational speed less than a predetermined rotational speed and that a synchronous PWM control is performed if the motor has a rotational speed greater than or equal to the predetermined rotational speed, when a low-PWM frequency command signal is input.

3 Claims, 6 Drawing Sheets

AIRCRAFT MOTOR DRIVE CONTROL APPARATUS AND AIRCRAFT MOTOR DRIVE CONTROL SYSTEM

CROSS-REFERENCE TO RELATED APPLICATIONS

This application claims priority to Japanese Patent Application No. 2011-009457. The entire disclosure of Japanese Patent Application No. 2011-009457 is hereby incorporated herein by reference.

BACKGROUND OF THE INVENTION

1. Field of the Invention

The present invention relates to an aircraft motor drive control apparatus and an aircraft motor drive control system that drive a motor mounted to an aircraft for driving a device installed in the aircraft and that control the operational status of the motor.

2. Description of Related Art

Various electrically powered devices are installed in an aircraft, and such devices are driven by motors (electric motors) mounted to the aircraft. Examples of the aforementioned devices include an electrically powered hydraulic pump for supplying pressure oil to a hydraulically operated actuator for driving control surfaces that are formed as moving surfaces (flight control surfaces) and are configured, for example, as an aileron and an elevator, as disclosed in JP 2007-46790A. Other examples include an electric actuator for driving the above-described control surfaces and a leg (a mechanism supporting the body of an aircraft on the ground) such as a landing gear (undercarriage).

A motor drive control apparatus (aircraft motor drive control apparatus) that is also mounted to the aircraft controls a motor for driving the above-described devices, and controls the operational status of the motor. From the viewpoint of increasing the efficiency, it is possible to use, as such a motor drive control apparatus, a motor drive control apparatus including an inverter that includes a switching element and that drives a motor and a control part that performs a pulse width modulation control (PWM control) of this inverter.

For the above-described motor drive control apparatus including an inverter and a control part that performs PWM control, the control performance can be improved by increasing the PWM frequency, which is the switching frequency (carrier frequency) of the switching element. However, an increase in the PWM frequency leads to an increase in the loss of the switching element that is proportional to the PWM frequency, resulting in an increase in the amount of heat generation as well. Therefore, it is desired to provide a motor drive control apparatus that can ensure control performance and suppress heat generation in a well-balanced manner.

On the other hand, JP 2010-57243A discloses, as a motor drive control apparatus provided in a vehicle, a motor drive control apparatus that controls the PWM frequency from the viewpoint of reducing the noise generated depending on the frequency band of the PWM frequency, in addition to the viewpoints of ensuring control performance and suppressing heat generation. Note that the motor drive control apparatus disclosed in JP 2010-57243A is configured to perform a synchronous PWM control if the current supplied to the motor by an inverter or the torque generated in the motor is greater than a threshold. Also, the motor drive control apparatus is configured to perform a synchronous PWM control or an asynchronous PWM control and to set the PWM frequency higher than in the case where the above-described current or torque is greater than the threshold if the above-described current or torque is smaller than the threshold.

SUMMARY OF THE INVENTION

For a motor drive control apparatus (aircraft motor drive control apparatus) used for the drive control of a motor for driving a device installed in an aircraft, a reduction of the noise that is generated depending on the frequency band of the PWM frequency is hardly needed, whereas it is desired to provide a motor drive control apparatus that can ensure control performance and suppress heat generation on a higher level in a well-balanced manner. Therefore, it is difficult to achieve this to a satisfying level with a configuration as that of the motor drive control apparatus disclosed in JP 2010-57243A, in which the PWM frequency is controlled by selecting a synchronous PWM control or one of a synchronous PWM control and an asynchronous PWM control according to whether the current supplied to the motor or the generated torque is greater or smaller than a threshold.

Further, the required operating condition of a device installed in an aircraft changes due to not only a situation where the flight condition of the aircraft is stable, but also various situations, including, for example, a situation where the flight condition of the aircraft changes suddenly due to the weather or the state of air currents, a situation where the aircraft performs the takeoff operation or the landing operation, and a situation where an unexpected trouble has occurred. Therefore, it is desired that a motor drive control apparatus that performs a drive control of a motor for driving a device for which the operating condition changes depending on the situation of the aircraft in this way can efficiently ensure control performance and suppress heat generation on a higher level in a well-balanced manner.

In view of the foregoing circumstances, it is an object of the present invention to provide an aircraft motor drive control apparatus and an aircraft motor drive control system that can be used for the drive control of a motor for driving a device for which the required operating condition changes depending on the situation of an aircraft and that can efficiently ensure control performance and suppress heat generation on a high level in a well-balanced manner.

According to a first aspect of an aircraft motor drive control apparatus according to the present invention for achieving the above-described object, there is provided an aircraft motor drive control apparatus that drives a motor mounted to an aircraft for driving a device installed in the aircraft and that controls an operational status of the motor, the apparatus including: an inverter that includes a switching element and that drives the motor; and a control part that performs a pulse width modulation control of the inverter, the control part including: a command signal processing unit that outputs a PWM frequency control signal for controlling a PWM frequency, which is a switching frequency of the switching element, based on a signal from a controller that generates a speed command signal that commands a rotational speed of the motor for controlling operation of the device and a PWM frequency command signal for commanding the PWM frequency; and a PWM frequency control unit that controls the PWM frequency based on the PWM frequency control signal, wherein the command signal processing unit: receives one of a first PWM frequency command signal and a second PWM frequency command signal as the PWM frequency command signal, outputs, as the PWM frequency control signal when the first PWM frequency command signal is received, a high-PWM frequency command signal for causing the PWM frequency control unit to control the PWM frequency such that an asynchronous PWM control is performed at the PWM frequency of a predetermined constant frequency, and outputs, as the PWM frequency control signal when the second PWM frequency command signal is received, a low-PWM frequency command signal for causing the PWM frequency control unit to control the PWM frequency such that an asynchronous PWM control or a synchronous PWM control is performed at the PWM frequency in a frequency range lower than the predetermined constant frequency, and the PWM frequency control unit controls the PWM frequency such that an asynchronous PWM control is performed if the motor has a rotational speed less than a predetermined rotational speed and that a synchronous PWM control is performed if the motor has a rotational speed greater than the predetermined rotational speed, when the low-PWM frequency command signal is input as the PWM frequency control signal.

With this configuration, the speed command signal of the motor and the PWM frequency command signal are transmitted from the controller to the aircraft motor drive control apparatus. Then, the controller can transmit, as the PWM frequency command signal, one of the first PWM frequency command signal and the second PWM frequency command signal, according to the situation of the aircraft. For example, the controller can transmit the second PWM frequency command signal in situations where there is less demand on the high response and high-speed rotation of the motor, including, for example, a situation where the flight condition of the aircraft is stable. Further, the controller can transmit the first PWM frequency command signal upon occurrence of a situation where there is high demand on the high response, high-speed rotation, and high output of the motor during activation or when high output drive is required after activation, for example, in a situation where the flight condition of the aircraft may change suddenly due to the weather and the state of air currents, a situation where the aircraft performs the takeoff operation or the landing operation, or a situation where an unexpected trouble has occurred.

When the first PWM frequency command signal is received, the PWM frequency is controlled in the aircraft motor drive control apparatus such that an asynchronous PWM control is performed at a PWM frequency of a predetermined constant frequency. Accordingly, the predetermined constant frequency is set to a high frequency, and therefore it is possible to ensure sufficient control performance, and increase the response of the motor as appropriate according to the situation of the aircraft. On the other hand, when the second PWM frequency command signal is received, the PWM frequency is controlled in the aircraft motor drive control apparatus at a PWM frequency in a frequency range lower than the above-described predetermined constant frequency. Accordingly, the PWM frequency is set to a low frequency when there is less demand on higher response of the motor, and therefore it is possible to reduce the loss of the switching element as appropriate according to the situation of the aircraft within the range in which control performance can be ensured, thus suppressing heat generation. Furthermore, when the second PWM frequency command signal is received, the PWM frequency is controlled in the aircraft motor drive control apparatus such that an asynchronous PWM control is performed if the motor has a rotational speed less than a predetermined rotational speed and that a synchronous PWM control is performed if the motor has a rotational speed greater than or equal to the predetermined rotational speed. Accordingly, even if there is less demand on higher response of the motor, it is possible to ensure the performance of controlling the motor as appropriate according to the rotational speed of the motor, while achieving balance with the suppression of heat generation.

Therefore, with the above-described configuration, it is possible to provide an aircraft motor drive control apparatus that can be used for drive control of a motor that drives a device for which the required operating condition changes depending on the situation of an aircraft and that can ensure control performance and suppress heat generation on a high level in a well-balanced manner.

According to a second aspect of the aircraft motor drive control apparatus the present invention, in the aircraft motor drive control apparatus of the first aspect, the command signal processing unit: receives, as the PWM frequency command signal, one of the first PWM frequency command signal, the second PWM frequency command signal, and a third PWM frequency command signal that commands that the PWM frequency control signal be determined in the command signal processing unit, outputs the high-PWM frequency command signal as the PWM frequency control signal if a speed change rate value, which is a value indicating a degree of change in the speed command signal, is greater than or equal to a predetermined determination value and outputs the low-PWM frequency command signal as the PWM frequency control signal if the speed change rate value is less than the predetermined determination value, when the third PWM frequency command signal is received.

With this configuration, the controller can also transmit, as the PWM frequency command signal, the third PWM frequency command signal depending on the situation of the aircraft, in addition to the first PWM frequency command signal and the second PWM frequency command signal. Also, when the third PWM frequency command signal is received, the aircraft motor drive control apparatus outputs the high-PWM frequency command signal if the speed change rate value is greater than or equal to the predetermined determination value and outputs the low-PWM frequency command signal if the speed change rate value is less than the predetermined determination value. Accordingly, it is possible to increase the response of the motor as appropriate when the degree of change in the rotational speed of the motor is large. When the degree of change in the rotational speed of the motor is small, it is possible to reduce the loss of the switching element as appropriate according to the situation of the aircraft within the range in which control performance can be ensured, thus suppressing heat generation.

In another aspect of the present invention, it is also possible to configure an aircraft motor drive control system including any of the above-described aircraft motor drive control apparatuses. That is, according to an aspect of an aircraft motor drive control system according to the present invention, there is provided an aircraft motor drive control system including: the aircraft motor drive control apparatus of the above-described first aspect; and the controller provided as a flight controller for controlling a control surface of an aircraft.

With this configuration, it is possible to provide an aircraft motor drive control system that can be used for drive control of a motor that drives a device for which the required operating condition changes depending on the situation of an aircraft and that can ensure control performance and suppress heat generation on a higher level in a well-balanced manner.

It should be appreciated that the above and other objects, and features and advantages of the present invention will become apparent from the following description taken in conjunction with the accompanying drawings.

DETAILED DESCRIPTION OF THE INVENTION

Hereinafter, an embodiment for carrying out the present invention will be described with reference to the accompanying drawings. Note that the embodiment of the present invention is widely applicable as an aircraft motor drive control apparatus and an aircraft motor drive control system that drive a motor mounted to an aircraft for driving a device installed in the aircraft and that control the operational status of the motor.

Figure 1:
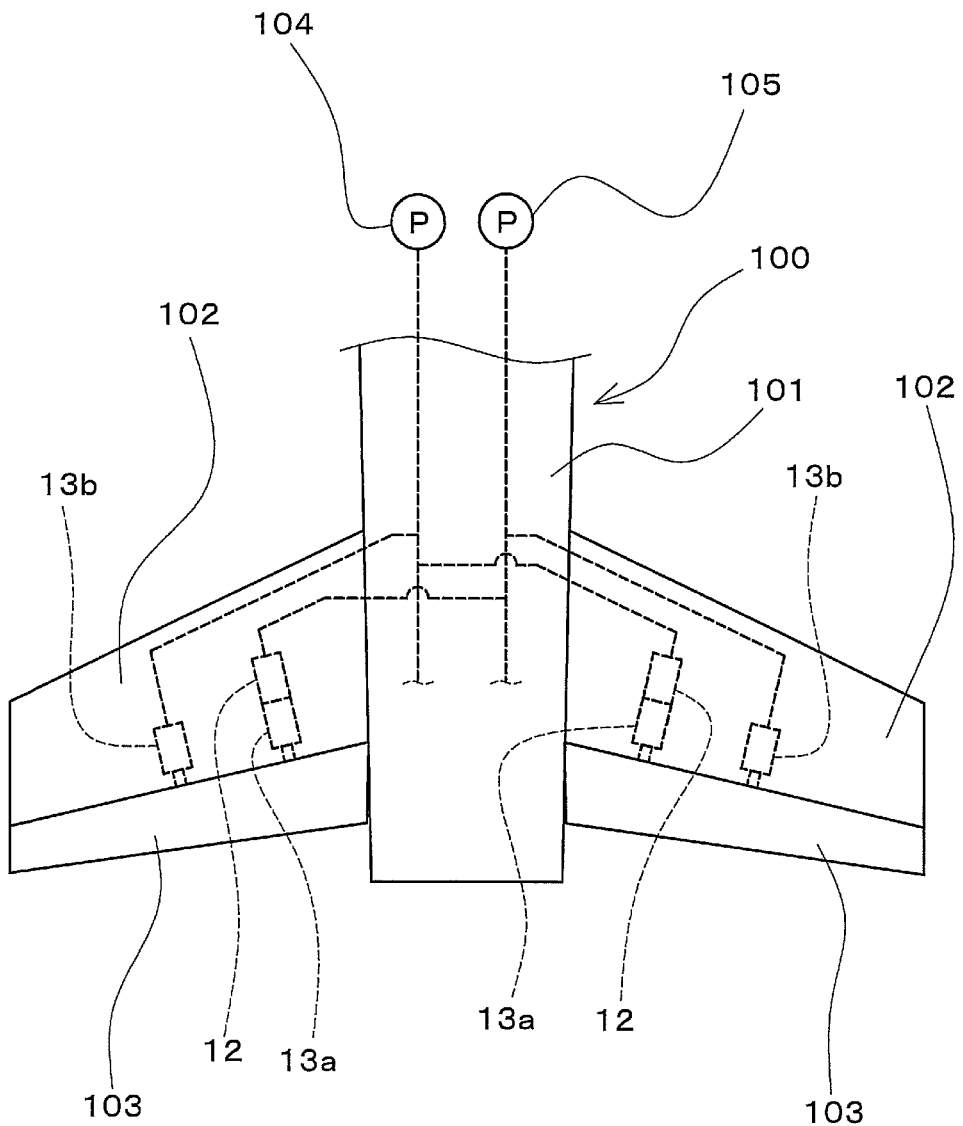
FIG. 1 is a diagram showing part of an aircraft in which is installed a device to which an aircraft motor drive control apparatus according to one embodiment of the present invention is applied.
Figure 2:
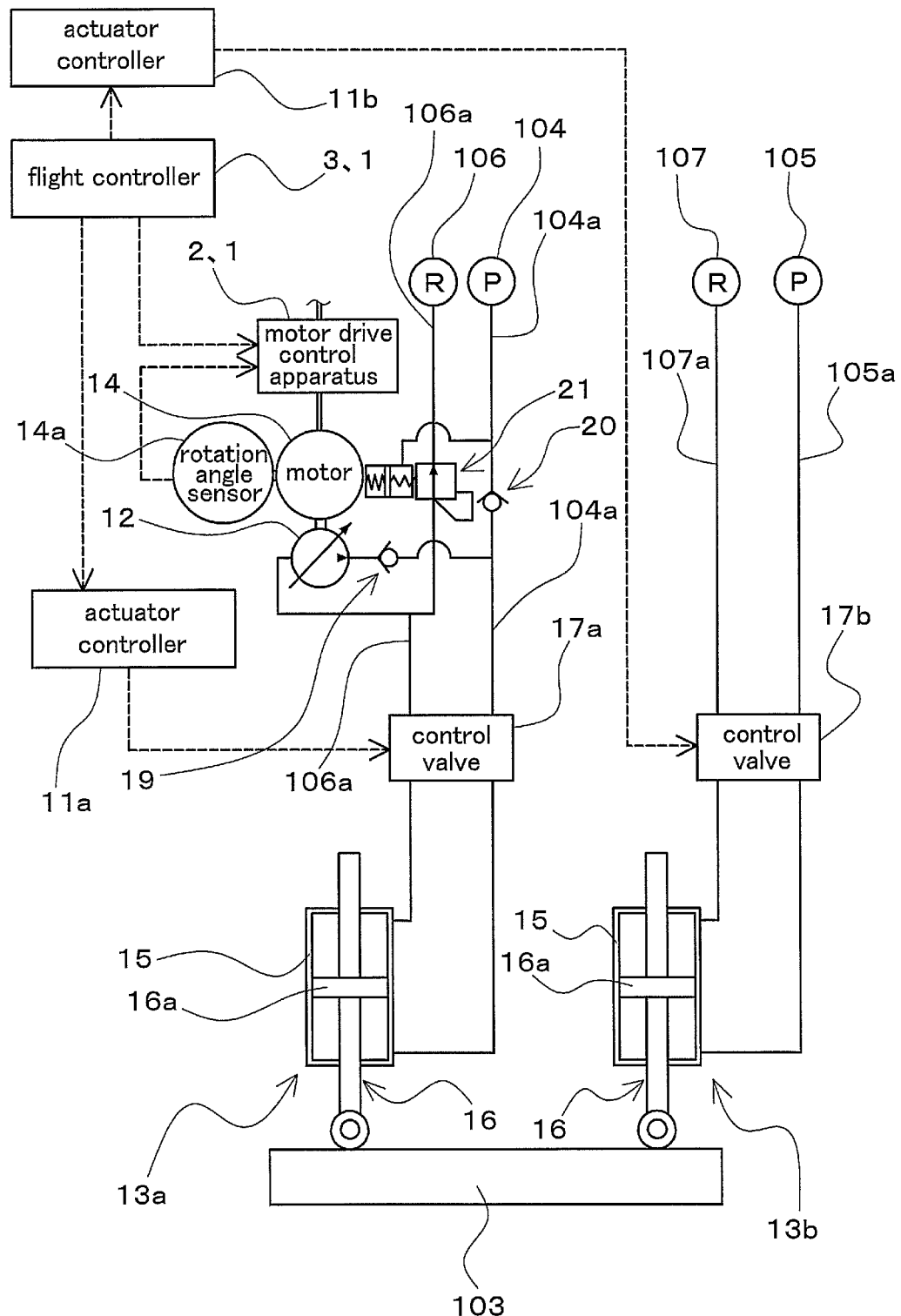
FIG. 2 is a diagram schematically showing an aircraft motor drive control apparatus and an aircraft motor drive control system according to one embodiment of the present invention, together with a hydraulic circuit including a device to which they are applied.

FIG. 1 is a diagram showing part of an aircraft 100 in which is installed a backup hydraulic pump 12 as an exemplary device to which an aircraft motor drive control apparatus and an aircraft motor drive control system according to one embodiment of the present invention are applied. Note that FIG. 1 shows part of the rear portion of a body 101 of the aircraft 100 and a pair of tailplanes (102), and illustration of a vertical tail at the rear part of the body 101 is omitted. FIG. 2 is a diagram schematically showing an aircraft motor drive control system 1 and an aircraft motor drive control apparatus 2 according to one embodiment of the present invention, together with a hydraulic circuit including the backup hydraulic pump 12 to which they are applied.

In the following, a description will be first given of the hydraulic circuit including the backup hydraulic pump 12 to which the aircraft motor drive control system 1 (hereinafter, also simply referred to as the "motor drive control system 1") and the aircraft motor drive control apparatus 2 (hereinafter, also simply referred to as the "motor drive control apparatus 2") are applied, followed by a description of the motor drive control system 1 and the motor drive control apparatus 2.

Each of the two tailplanes (102) of the aircraft 100 is provided with an elevator 103 as a moving surface (flight control surface) constituting a control surface of the aircraft 100. The elevator 103 of each tailplane 102 is configured to be driven by a plurality of (for example, two) actuators (13a 13b), as illustrated in FIG. 1. The actuators (13a, 13b) for driving the elevators 103 and the backup hydraulic pump 12 configured to supply pressure oil to one of the actuators, namely the actuator 13a are installed inside each tailplane 102.

In this embodiment, the actuators (13a, 13b) and the backup hydraulic pump 12 that are respectively installed in the pair of tailplanes (102) are configured in the same manner. Therefore, the actuators (13a, 13b) and the backup hydraulic pump 12 that are installed in one of the tailplanes 102 will be described. The description of the actuators (13a, 13b) and the backup hydraulic pump 12 installed in the other tailplane 102 is omitted.

FIG. 2 is shown as a hydraulic circuit diagram showing a hydraulic circuit including the actuators (13a, 13b) for driving an elevator 103 provided in one of the tailplanes 102 and the backup hydraulic pump 12 configured to supply pressure oil to one of the actuators, namely the actuator 13a. As shown in FIG. 2, each of the actuators (13a, 13b) includes, for example, a cylinder 15 and a rod 16 provided with a piston 16a, which divides the interior of the cylinder 15 into two oil chambers. Also, the oil chambers in the cylinder 15 of the actuator 13a are respectively configured to be in communication with a first aircraft central hydraulic power source 104 and a reservoir circuit 106 via a control valve 17a. On the other hand, the oil chambers in the cylinder 15 of the actuator 13b are respectively configured to be in communication with a second aircraft central hydraulic power source 105 and a reservoir circuit 107 via a control valve 17b.

The first aircraft central hydraulic power source 104 and the second aircraft central hydraulic power source 105 are provided as hydraulic power sources each including a hydraulic pump that supplies pressure oil and installed on the body 101 side (inside the body 101) as systems that are independent of each other. By supplying the pressure oil from the first and second aircraft central hydraulic power sources (104, 105), the actuators (13a, 13b) for driving the elevator 103 and actuators (not shown) for driving control surfaces other than the elevator 103 are operated. The first aircraft central hydraulic power source 104 is connected so as to be able to supply pressure oil to the actuator 13a installed in one of the tailplanes 102 and the actuator 13b installed in the other tailplane 102. On the other hand, the second aircraft central hydraulic power source 105 is connected so as to be able to supply pressure oil to the actuator 13b installed in one of the tailplanes 102 and the actuator 13a installed in the other tailplane 102.

The reservoir circuit 106 includes a tank (not shown) into which oil (hydraulic fluid) that is supplied as pressure oil and is thereafter discharged from the actuator 13a flows back, and the reservoir circuit 106 is configured to be in communication with the first aircraft central hydraulic power source 104. The reservoir circuit 107 that is configured as a system independent of the reservoir circuit 106 includes a tank (not shown) into which oil (hydraulic fluid) that is supplied as pressure oil and is thereafter discharged from the actuator 13b flows back, and the reservoir circuit 107 is configured to be in communication with the second aircraft central hydraulic power source 105 that is configured as a system independent of the first aircraft central hydraulic power source 104. Note that the reservoir circuit 106 is connected with the actuator 13a installed in one of the tailplanes 102 and the actuator 13b installed in the other tailplane 102, and is also connected with the first aircraft central hydraulic power source 104. Consequently, the pressure of the oil that has returned to the reservoir circuit 106 is raised by the first aircraft central hydraulic power source 104 and the oil is supplied to the predetermined actuators (13a, 13b). On the other hand, the reservoir circuit 107 is connected with the actuator 13b installed in one of the tailplanes 102 and the actuator 13a installed in the other tailplane 102, and is also connected with the second aircraft central hydraulic power source 105. Consequently, the pressure of the oil that has returned to the reservoir circuit 107 is raised by the second aircraft central hydraulic power source 105 and the oil is supplied to the predetermined actuators (13*a*, 13*b*).

The control valve 17*a* is provided as a valve mechanism that switches the state of connection of the oil chambers of the actuator 13*a* with a supply passage 104*a* that is in communication with the first aircraft central hydraulic power source 104 and an exhaust passage 106*a* that is in communication with the reservoir circuit 106. The control valve 17*b* is provided as a valve mechanism that switches the state of connection of the oil chambers of the actuator 13*b* with a supply passage 105*a* that is in communication with the second aircraft central hydraulic power source 105 and an exhaust passage 107*a* that is in communication with the reservoir circuit 107. The control valve 17*a* may be configured, for example, as an electromagnetic switching valve, and may be driven based on a command signal from an actuator controller 11*a* that controls operation of the actuator 13*a*. The control valve 17*b* may be configured, for example, as an electromagnetic switching valve, and may be driven based on a command signal from an actuator controller 11*b* that controls operation of the actuator 13*b*.

The actuator controller 11*a* controls the actuator 13*a* based on a command signal from a flight controller 3, which is a superordinate computer that commands operation of the elevator 103, of the motor drive control system 1 of this embodiment. The actuator controller 11*b* controls the actuator 13*b* based on a command signal from the flight controller 3.

Further, the control valve 17*a* described above is switched based on a command from the actuator controller 11*a*, and thereby pressure oil is supplied from the supply passage 104*a* to one of the oil chambers of the cylinder 15 and the oil is discharged from the other of the oil chambers to the exhaust passage 106*a*. Consequently, the rod 16 is displaced relative to the cylinder 15, thus driving the elevator 103. Note that the control valve 17*b* is configured in the same manner as the control valve 17*a* described above, and therefore the description thereof is omitted.

The backup hydraulic pump 12 is installed inside the tailplane 102, and is configured to supply pressure oil to the hydraulically operated actuator 13*a* for driving the elevator 103. Although this embodiment is described, taking, as an example, a configuration in which the backup hydraulic pump 12 supplies pressure oil to the actuator 13*a* for driving a control surface configured as the elevator 103, this need not be the case. That is, the backup hydraulic pump 12 may be configured to supply pressure oil to an actuator for driving a control surface other than an elevator, such as an aileron.

The suction side of the backup hydraulic pump 12 is connected in communication with the exhaust passage 106*a*, and its discharge side is connected in communication with the supply passage 104*a* via a check valve 19 so as to be able to supply pressure oil to the supply passage 104*a*. Further, the backup hydraulic pump 12 is provided as a hydraulic pump that can supply pressure oil to the actuator 13*a* at the occurrence of a loss or degradation of the function (pressure oil supply function) of the first aircraft central hydraulic power source 104 due to a failure of the hydraulic pump, an oil leakage, or the like in the first aircraft central hydraulic power source 104.

Also, a check valve 20 that permits flow of pressure oil into the actuator 13*a* and prevents flow of the oil in the opposite direction is provided upstream (on the first aircraft central hydraulic power source 104 side) of a location of the supply passage 104*a* where the discharge side of the backup hydraulic pump 12 is connected. Further, a relief valve 21 that discharges pressure oil into the reservoir circuit 106 when the pressure of the oil discharged from the actuator 13*a* rises is provided downstream (on the reservoir circuit 106 side) of a location of the exhaust passage 106*a* where the suction side of the backup hydraulic pump 12 is connected. Also, the relief valve 21 is provided with a pilot pressure chamber that is in communication with the supply passage 104*a* and in which a spring is disposed. When the pressure of the pressure oil supplied from the supply passage 104*a* decreases below a predetermined pressure value, the pressure of the pressure oil being supplied as a pilot pressure oil to the pilot pressure chamber (pilot pressure) from the supply passage 104*a* also decreases below the predetermined pressure value, as a result of which the exhaust passage 106*a* is blocked by the relief valve 21. In the case of a loss or degradation of the function of the first aircraft central hydraulic power source 104, the provision of the check valves (19, 20) and the relief valve 21 described above allows the pressure of the oil discharged from the actuator 13*a* to be raised by the backup hydraulic pump 12 without the oil returning to the reservoir circuit 106, and the pressure oil with an increased pressure is supplied to the actuator 13*a*.

A motor 14 as shown in FIG. 2 is provided as an electric motor, is coupled to the backup hydraulic pump 12 via a coupling, and is configured to drive the backup hydraulic pump 12. That is, the motor 14 constitutes a motor of this embodiment that is mounted to the aircraft 100 for driving the backup hydraulic pump 12 serving as the device of this embodiment that is installed in the aircraft 100.

Further, the motor 14 is configured as a synchronous motor in this embodiment. Although the motor 14 may be configured as an electric motor other than a synchronous motor, a motor 14 configured as a synchronous motor can achieve a greater improvement in efficiency than a motor 14 configured as an induction motor that has a slip, which is a delay in the rotational speed of the rotor relative to the rotating magnetic field of the stator. Additionally, the motor 14 is provided with a rotation angle sensor 14*a* that detects its rotational speed (number of revolutions). The rotation angle sensor 14*a* may be configured, for example, by a rotary encoder, a resolver, or a tacho generator.

Figure 3:
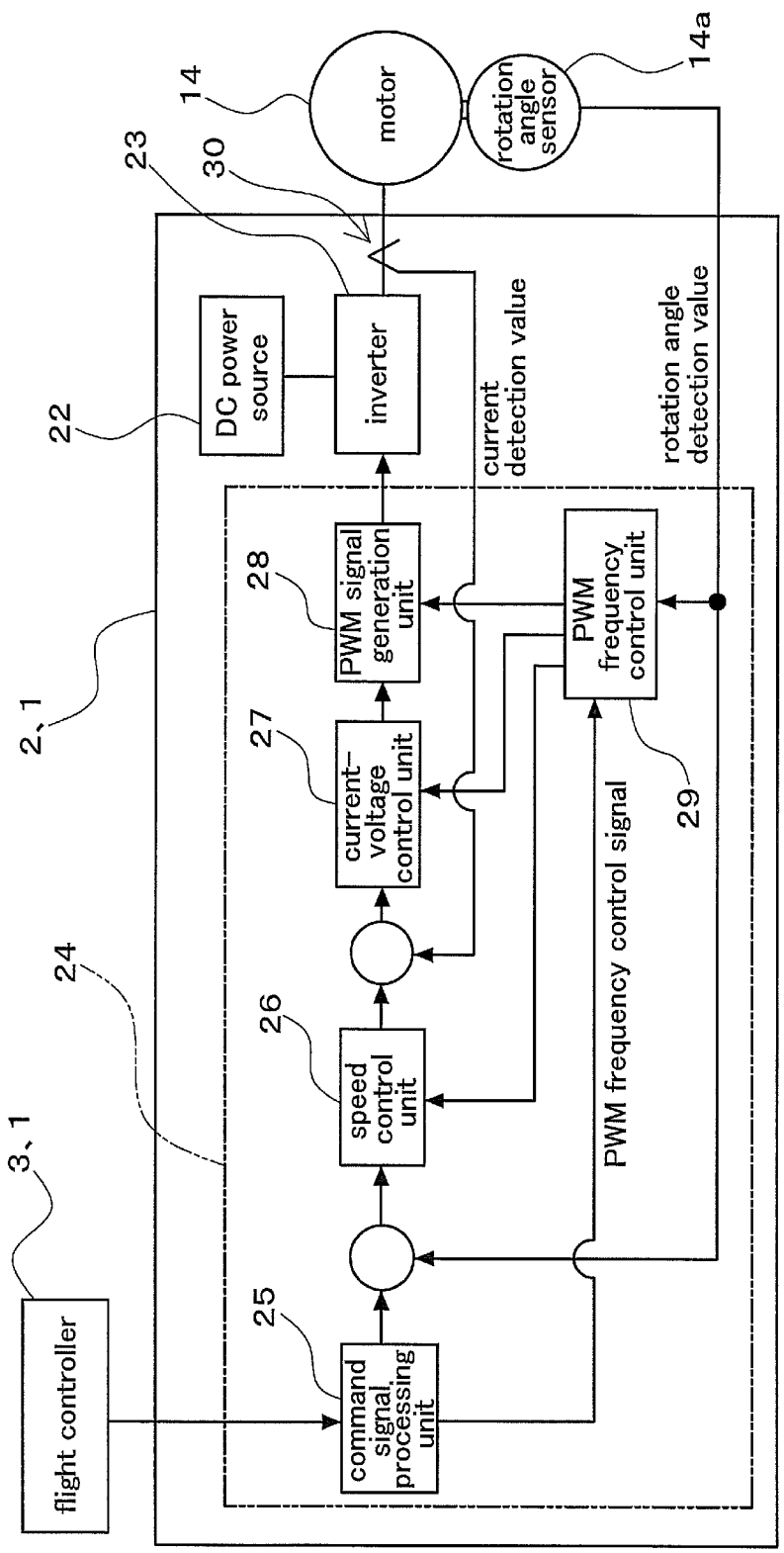
FIG. 3 is a block diagram showing the configuration of the aircraft motor drive control apparatus shown in FIG. 2.

The following describes the motor drive control system 1 and the motor drive control apparatus 2 of this embodiment that drive the motor 14 and control the operational status of the motor 14. FIG. 3 is a block diagram showing the motor drive control system 1 and the motor drive control apparatus 2. As shown in FIGS. 2 and 3, the motor drive control system 1 includes the flight controller 3 and the motor drive control apparatus 2.

The flight controller 3 is provided as a computer that controls operation of the elevator 103 serving as a control surface, and is provided also as a controller of this embodiment that transmits various signals to the motor drive control apparatus 2. The operational status of the motor 14 is controlled by the motor drive control apparatus 2 based on signals from the flight controller 3. Note that the flight controller 3 may include, for example, a central processing unit (CPU), a memory, an interface, and so forth, which are not shown.

The flight controller 3 is connected to a pressure sensor (not shown) that detects the discharge pressure of the first aircraft central hydraulic power source 104 or the pressure of pressure oil passing through the supply passage 104*a* such that a pressure detection signal detected by the pressure sensor is input into the flight controller 3. Also, the flight controller 3 is configured to detect a loss or degradation of the function of the first aircraft central hydraulic power source 104 based on the above-stated pressure detection signal.

When a loss or degradation of the function of the first aircraft central hydraulic power source 104 is detected by the flight controller 3, operation of the motor 14 is started under control by the motor drive control apparatus 2 based on a command signal from the flight controller 3, thus operating the backup hydraulic pump 12 and supplying pressure oil to the actuator 13a. Note that after the backup hydraulic pump 12 is activated in this way, the rotational speed and the output torque of the motor 14 are controlled by the motor drive control apparatus 2 performing a control based on a signal from the flight controller 3 as corresponding to the operational condition of the actuator 13a according to the flight condition of the aircraft 100.

The flight controller 3 activates the motor 14 not only in a situation where an unexpected trouble such as a loss or degradation of the function of the first aircraft central hydraulic power source 104 has occurred, but also in a situation where the flight condition of the aircraft 100 may change suddenly due to the weather and the state of air currents, or in a situation where the aircraft 100 performs the takeoff operation or the landing operation. This allows the pressure oil to be supplied from the backup hydraulic pump 12 to the actuator 13a in the above-described situations, thus enhancing the pressure oil supply function to the actuator 13a. Furthermore, even if there is a sudden loss or degradation of the first aircraft central hydraulic power source 104 in the above-described situations, a safe flight can be quickly ensured because the motor 14 is already in operation. Note that after the backup hydraulic pump 12 is activated in the above-described situations, the rotational speed and the output torque of the motor 14 are controlled by the motor drive control apparatus 2 performing control based on a signal from the flight controller 3 as corresponding to the operational condition of the actuator 13a according to the flight condition of the aircraft 100.

As shown in FIG. 3, the motor drive control apparatus 2 may include, for example, a DC power source 22, an inverter 23, and a control part 24. The DC power source (direct-current power source) 22 may be provided, for example, as a rectifier (converter) that converts an alternating current supplied from an alternating-current power supply installed on the aircraft 100 body side into a direct current by rectification.

The inverter 23 includes a switching element such as an insulated gate bipolar transistor (IGBT), and is configured to drive the motor 14 with electric power supplied from the DC power source 22, based on a command from the control part 24. In this configuration, the current value of the current flowing through a drive wire that connects the inverter 23 to the motor 14 is detected by a current sensor 30 and is input to the control part 24.

The control part 24 is provided as a control circuit that performs a pulse width modulation control (PWM control) of the inverter 23. The control part 24 controls the rotational speed of the motor 14 based on a speed command signal that is generated in the flight controller 3 that commands the rotational speed of the motor 14 for controlling operation of the backup hydraulic pump 12 and a rotation angle detection value detected by the rotation angle sensor 14a. Also, the control part 24 may include, for example, a command signal processing unit 25, a speed control unit 26, a current-voltage control unit 27, a PWM signal generation unit 28, and a PWM frequency control unit 29.

Figure 4:
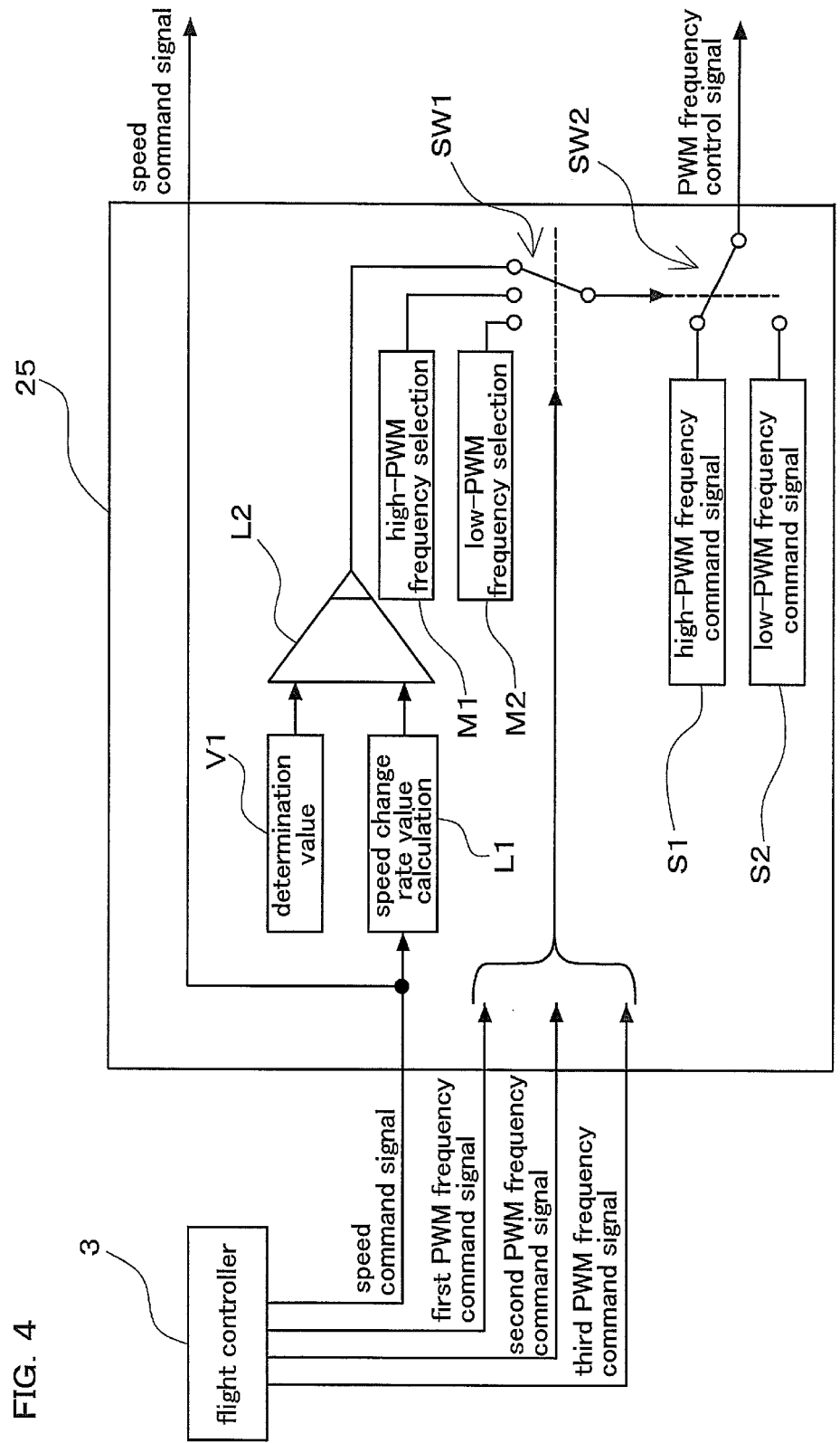
FIG. 4 is a functional block diagram illustrating the processing executed in the aircraft motor drive control apparatus shown in FIG. 3.

FIG. 4 is a functional block diagram illustrating the processing executed in the command signal processing unit 25. The command signal processing unit 25 shown in FIGS. 3 and 4 outputs a PWM frequency control signal for controlling the PWM frequency based on signals from the flight controller 3 that generates the above-described speed command signal and a PWM frequency command signal for commanding the PWM frequency, which is the switching frequency (carrier frequency) of the switching element of the inverter 23.

Also, the command signal processing unit 25 receives one of a first PWM frequency command signal, a second PWM frequency command signal, and a third PWM frequency command signal as the above-described PWM frequency command signal. Note that one of the first PWM frequency command signal, the second PWM frequency command signal, and the third PWM frequency command signal is transmitted from the flight controller 3 to the command signal processing unit 25 of the motor drive control apparatus 2 according to the situation of the aircraft 100.

The first PWM frequency command signal is configured as a signal for causing the command signal processing unit 25 to switch a switch SW1 so as to set a predetermined flag in a high-PWM frequency selection mode M1, which is a mode in which a high-PWM frequency command signal S1 is output. When the switch SW1 is set to the high-PWM frequency selection mode M1, a switch SW2 is set such that the high-PWM frequency command signal S1 is output. Note that the high-PWM frequency command signal S1, the high-PWM frequency selection mode M1, and the switches (SW1, SW2) are schematically shown in FIG. 3 in the form of a block diagram by applying reference numerals thereto. Although the switches (SW1, SW2) are configured by software in this embodiment, this need not be the case; the switches (SW1, SW2) may be configured by hardware.

Accordingly, the high-PWM frequency command signal S1 is output as the PWM frequency control signal when the command signal processing unit 25 receives the first PWM frequency command signal. Note that the high-PWM frequency command signal S1 is configured as a signal for causing the PWM frequency control unit 29, which will be described later, to control the PWM frequency such that an asynchronous PWM control is performed at a PWM frequency of a predetermined constant frequency.

The second PWM frequency command signal is configured as a signal for causing the command signal processing unit 25 to switch the switch SW1 so as to set a predetermined flag in a low-PWM frequency selection mode M2, which is a mode in which a low-PWM frequency command signal S2 is output. When the switch SW1 is set to the low-PWM frequency selection mode M2, the switch SW2 is set such that the low-PWM frequency command signal S2 is output. Note that the low-PWM frequency command signal S2 and the low-PWM frequency selection mode M2 are also schematically shown in FIG. 3 in the form of a block diagram by applying reference numerals thereto.

Accordingly, the low-PWM frequency command signal S2 is output as the PWM frequency control signal when the command signal processing unit 25 receives the second PWM frequency command signal. Note that the low-PWM frequency command signal S2 is configured as a signal for causing the PWM frequency control unit 29, which will be described later, to control the PWM frequency such that an asynchronous PWM control or a synchronous PWM control is performed at a PWM frequency in a frequency range lower than the predetermined constant frequency in the case of the high-PWM frequency command signal S1.

The third PWM frequency command signal is configured as a signal that commands that the PWM frequency control signal be determined in the command signal processing unit 25. Meanwhile, in the command signal processing unit 25, a speed change rate value, which is a value indicating the degree of change in the speed command signal, is calculated in a speed change rate value calculation logic unit L1 incorporated inside the command signal processing unit 25, based on a speed command signal of the motor 14 that is received from the flight controller 3. Further, in the command signal processing unit 25, a calculation result for the above-described speed change rate value is compared with a predetermined determination value V1 and it is determined whether the speed change rate value is greater than or equal to the determination value V1 or less than the determination value V1 in a comparison-determination logic unit L2. Note that the determination value V1 is also schematically shown in FIG. 3 in the form of a block diagram by applying a reference numeral thereto.

The command signal processing unit 25 switches the switch SW1 so as to set a predetermined flag in a mode in which the PWM frequency control signal is output based on the result of a determination performed by the comparison-determination logic unit L2, when the third PWM frequency command signal is received as the PWM frequency command signal. That is, in this case, the switch SW1 is switched to the state shown in FIG. 4. When the switch SW1 is set to the above-described mode shown in FIG. 4, the switch SW2 is set in the command signal processing unit 25 such that the high-PWM frequency command signal S1 is output if the speed change rate value is greater than or equal to the determination value V1 and that the low-PWM frequency command signal S2 is output if the speed change rate value is less than the determination value V1.

Accordingly, the high-PWM frequency command signal S1 is output as the PWM frequency control signal if the speed change rate value is greater than or equal to the determination value V1 and the low-PWM frequency command signal S2 is output as the PWM frequency control signal if the speed change rate value is less than the determination value V1, when the command signal processing unit 25 receives the third PWM frequency command signal.

Figure 5:
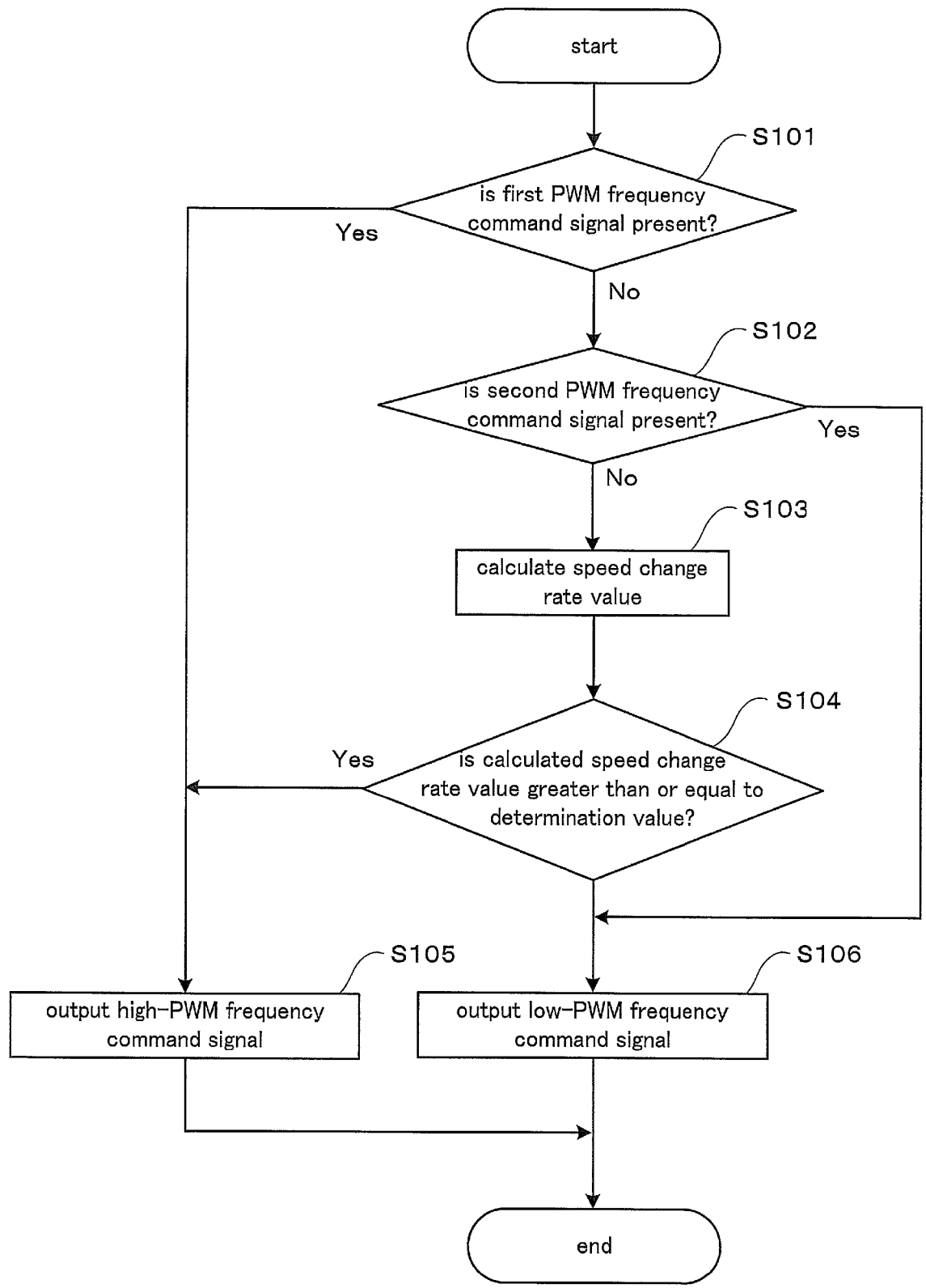
FIG. 5 is a flowchart illustrating the processing executed in the aircraft motor drive control apparatus shown in FIG. 3.

FIG. 5 is a flowchart illustrating the above-described processing executed in the command signal processing unit 25. In the command signal processing unit 25, it is first determined whether the PWM frequency command signal received from the flight controller 3 is the first PWM frequency command signal (step S101). Then, if the first PWM frequency command signal is received (step S101, Yes), the high-PWM frequency command signal S1 is output as the PWM frequency control signal (step S105).

On the other hand, if it is determined that the first PWM frequency command signal is not received (step S101, No), it is subsequently determined whether the signal from the flight controller 3 is the second PWM frequency command signal (step S102). Then, if the second PWM frequency command signal is received (step S102, Yes), the low-PWM frequency command signal S2 is output as the PWM frequency control signal (step S106).

If it is determined in step S102 that the second PWM frequency command signal is not received (step S102, No), the speed change rate value is subsequently calculated (step S103). Then, it is determined whether the speed change rate value is greater than or equal to the determination value V1 (step S104). If the speed change rate value is determined to be greater than or equal to the determination value V1 (step S104, Yes), the high-PWM frequency command signal S1 is output as the PWM frequency control signal (step S105). On the other hand, if the speed change rate value is determined to be less than the determination value V1 (step S104, No), the low-PWM frequency command signal S2 is output as the PWM frequency control signal (step S106).

After execution of step S105 or step S106, the processing in and after step S101 is executed again in the command signal processing unit 25. That is, the processing from step S101 to step S106 is repeatedly executed in the command signal processing unit 25.

The speed control unit 26 shown in FIG. 3 is configured to perform a feedback control of the rotational speed of the motor 14 based on a speed command signal of the motor 14 that is transmitted from the flight controller 3 and is input via the command signal processing unit 25, and a rotation angle detection value detected by the rotation angle sensor 14*a*.

In the current-voltage control unit 27 shown in FIG. 3, a current command value is calculated based on the command signal of the output torque that is transmitted from the flight controller 3 and the current detection value detected by the current sensor 30. Further, in the current-voltage control unit 27, a voltage command value is calculated based on the calculated current command value. The current and the voltage of the motor 14 are controlled based on the current command value and the voltage command value.

The PWM signal generation unit 28 shown in FIG. 3 is configured to generate a PWM waveform signal by comparing a sine wave as a voltage command value generated by the current-voltage control unit 27 with a triangular wave as a carrier wave generated by the PWM frequency control unit 29, which will be described later.

The PWM frequency control unit 29 shown in FIG. 3 is configured to control the PWM frequency based on the PWM frequency control signal that has been output from the command signal processing unit 25. Here, FIG. 6 (FIG. 6A, FIG. 6B) are graphs illustrating the processing executed in the PWM frequency control unit 29, schematically showing the relationship between the PWM frequency and the rotational speed of the motor 14.

Figure 6A:
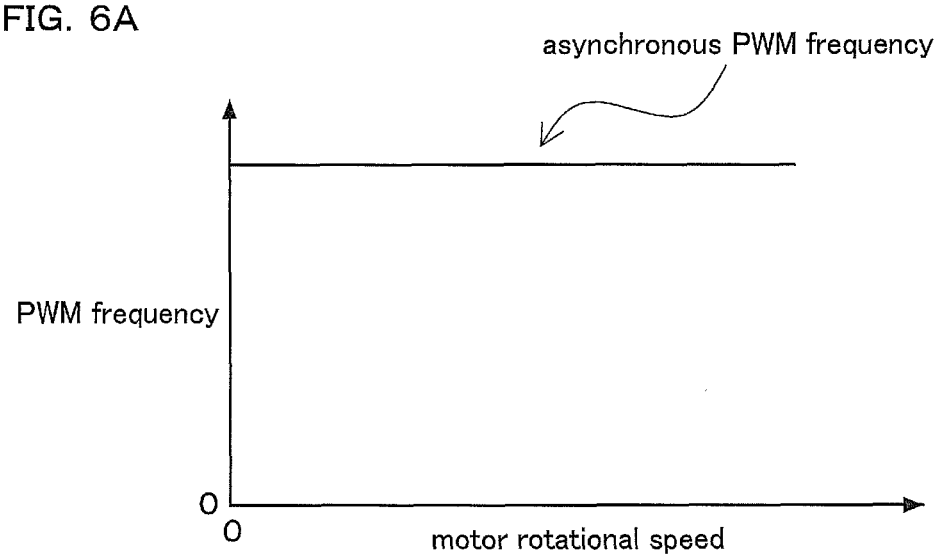
FIG. 6A is a graph illustrating the processing executed in the aircraft motor drive control apparatus shown in FIG. 3.

When the high-PWM frequency command signal S1 is input as the PWM frequency control signal, the PWM frequency control unit 29 controls the PWM frequency such that an asynchronous PWM control is performed at a constant high frequency as shown in FIG. 6A. That is, in this case, the PWM frequency control unit 29 generates a triangular wave of a PWM frequency of a constant high frequency that is not synchronous with the output frequency of the inverter 23 that commands the rotational speed of the motor 14 and that is not synchronous with the rotational speed of the motor 14.

Figure 6B:
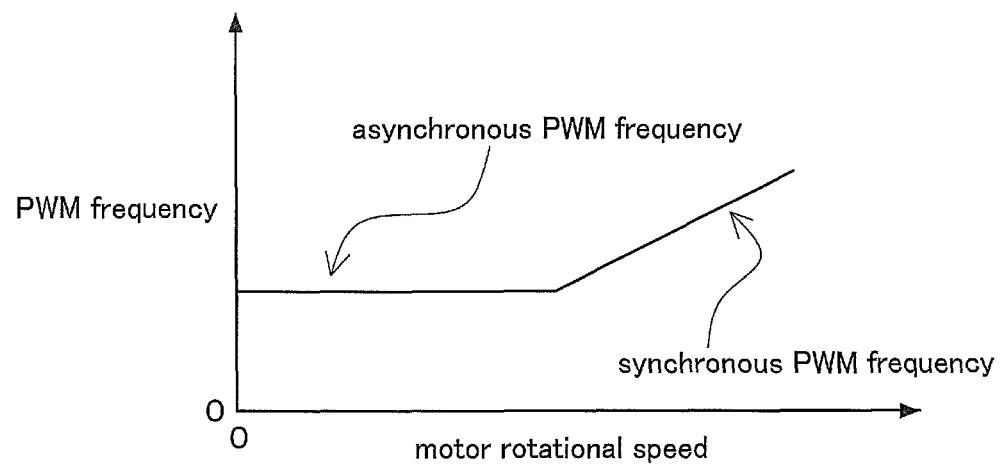
FIG. 6B is a graph illustrating the processing executed in the aircraft motor drive control apparatus shown in FIG. 3.

When the low-PWM frequency command signal S2 is input as the PWM frequency control signal, the PWM frequency control unit 29 controls the PWM frequency such that an asynchronous PWM control is performed if the motor 14 has a rotational speed less than a predetermined rotational speed and that a synchronous PWM control is performed if the motor 14 has a rotational speed greater than or equal to the predetermined rotational speed, as shown in FIG. 6B. That is, in this case, the PWM frequency control unit 29 generates a triangular wave of a PWM frequency of a constant low frequency that is not synchronous with the output frequency of the inverter 23 and that is not synchronous with the rotational speed of the motor 14, if the motor 14 has a rotational speed less than the predetermined rotational speed. On the other hand, the PWM frequency control unit 29 generates a triangular wave of a PWM frequency of a low frequency that is synchronous with the output frequency of the inverter 23 and that is synchronous with the rotational speed of the motor 14, if the rotational speed of the motor 14 becomes greater than or equal to the predetermined rotational speed.

The PWM frequency control unit 29 is configured to adjust the control gain of a control loop with respect to the speed control unit 26 and the current-voltage control unit 27, when performing a control so as to change the PWM frequency. Also, the PWM frequency control unit 29 is configured to make a transition to a newly switched PWM frequency when switching between a PWM frequency control based on the high-PWM frequency command signal S1 and a PWM frequency control based on the low-PWM frequency command signal S2, while gradually increasing or decreasing the PWM frequency.

As described thus far, according to this embodiment, the speed command signal of the motor 14 and the PWM frequency command signal are transmitted from the flight controller 3 to the motor drive control apparatus 2. Then, the flight controller 3 can transmit, as the PWM frequency command signal, one of the first PWM frequency command signal, the second PWM frequency command signal, and the third PWM frequency command signal according to the situation of the aircraft 100. For example, the flight controller 3 can transmit the second PWM frequency command signal in situations where there is less demand on the high response and high-speed rotation of the motor 14, including, for example, a situation where the flight condition of the aircraft 100 is stable after activation of the motor 14. Further, the flight controller 3 can transmit the first PWM frequency command signal upon occurrence of a situation where there is high demand on the high response, high-speed rotation, and high output of the motor 14 during activation or when high output drive is required after activation, for example, in a situation where the flight condition of the aircraft 100 may change suddenly due to the weather and the state of air currents or a situation where the aircraft 100 performs the takeoff operation or the landing operation.

When the first PWM frequency command signal is received, the PWM frequency is controlled in the motor drive control apparatus 2 such that an asynchronous PWM control is performed at a PWM frequency of a predetermined constant frequency. Accordingly, the predetermined constant frequency is set to a high frequency, and therefore it is possible to ensure sufficient control performance, and increase the response of the motor 14 as appropriate according to the situation of the aircraft 100.

On the other hand, when the second PWM frequency command signal is received, the PWM frequency is controlled in the motor drive control apparatus 2 at a PWM frequency in a frequency range lower than the above-described predetermined constant frequency. Accordingly, the PWM frequency is set to a low frequency when there is less demand on higher response of the motor 14, and therefore it is possible to reduce the loss of the switching element of the inverter 23 as appropriate according to the situation of the aircraft 100 within the range in which control performance can be ensured, thus suppressing heat generation. Furthermore, when the second PWM frequency command signal is received, the PWM frequency is controlled in the motor drive control apparatus 2 such that an asynchronous PWM control is performed if the motor 14 has a rotational speed less than a predetermined rotational speed and that a synchronous PWM control is performed if the motor 14 has a rotational speed greater than or equal to the predetermined rotational speed. Accordingly, even if there is less demand on higher response of the motor 14, it is possible to ensure the performance of controlling the motor 14 as appropriate according to the rotational speed of the motor 14, while achieving balance with the suppression of heat generation.

Therefore, according to this embodiment, it is possible to provide a motor drive control system 1 and a motor drive control apparatus 2 that can be used for drive control of a motor 14 that drives a backup hydraulic pump 12, which is a device for which the required operating condition changes depending on the situation of an aircraft 100 and that can ensure control performance and suppress heat generation on a higher level in a well-balanced manner.

According to this embodiment, the flight controller 3 can also transmit, as the PWM frequency command signal, the third PWM frequency command signal depending on the situation of the aircraft 100, in addition to the first PWM frequency command signal and the second PWM frequency command signal. Also, when the third PWM frequency command signal is received, the motor drive control apparatus 2 outputs the high-PWM frequency command signal S1 if the speed change rate value is greater than or equal to the predetermined determination value V1 and outputs the low-PWM frequency command signal S2 if the speed change rate value is less than the predetermined determination value V1. Accordingly, it is possible to increase the response of the motor 14 as appropriate when the degree of change in the rotational speed of the motor 14 is large. When the degree of change in the rotational speed of the motor 14 is small, it is possible to reduce the loss of the switching element of the inverter 23 as appropriate according to the situation of the aircraft 100 within the range in which control performance can be ensured, thus suppressing heat generation.

Although an embodiment of the present invention has been described thus far, the present invention is not limited to the above-described embodiment, and various modifications may be made within the scope recited in the claims.

(1) Although the above embodiment has been described, taking, as an example, a backup hydraulic pump as the device driven by the motor for which a drive control is performed by the motor drive control apparatus and the motor drive control system according to the present invention, this need not be the case. That is, the present invention may be applied as a motor drive control apparatus and a motor drive control system that perform a drive control of a motor for driving a device other than a backup hydraulic pump.

For example, when a hydraulic pump of an aircraft central hydraulic power source is configured as an electrically powered hydraulic pump driven by a motor, the present invention may be applied as a motor drive control apparatus that performs a drive control of the motor for driving the above-mentioned hydraulic pump as a device installed in an aircraft. Further, when an actuator for driving a control surface is configured as an electric actuator, the present invention may be applied as a motor drive control apparatus and a motor drive control system that perform a drive control of a motor for driving the electric actuator as a device installed in an aircraft. The present invention may also be applied as a motor drive control apparatus that performs a drive control of a motor for driving a leg (a mechanism supporting the body of an aircraft on the ground) such as a landing gear (undercarriage) as a device installed in an aircraft.

(2) Although the above embodiment has been described, taking, as an example, a configuration in which the controller also transmits the third PWM frequency command signal as the PWM frequency command signal, in addition to the first PWM frequency command signal and the second PWM frequency command signal, this need not be the case. It is possible to adopt a configuration in which the controller transmits only the first PWM frequency command signal and the second PWM frequency command signal as the PWM frequency command signal.

The present invention is widely applicable as an aircraft motor drive control apparatus and an aircraft motor drive control system that drive a motor mounted to an aircraft for driving a device installed in the aircraft and that control the operational status of the motor. The present invention is not limited to the above-described embodiment, and all modifications, applications and equivalents thereof that fall within the claims, for which modifications and applications would become apparent by reading and understanding the present specification, are intended to be embraced therein.

What is claimed is:

1. An aircraft motor drive control apparatus that drives a motor mounted to an aircraft for driving a device installed in the aircraft and that controls an operational status of the motor, the apparatus comprising:

an inverter that includes a switching element and that drives the motor; and a control part that performs a pulse width modulation control of the inverter, the control part including:

a command signal processing unit that outputs a PWM frequency control signal for controlling a PWM frequency, which is a switching frequency of the switching element, based on a signal from a controller that generates a speed command signal that commands a rotational speed of the motor for controlling operation of the device and a PWM frequency command signal for commanding the PWM frequency; and a PWM frequency control unit that controls the PWM frequency based on the PWM frequency control signal, wherein the command signal processing unit:

receives one of a first PWM frequency command signal and a second PWM frequency command signal as the PWM frequency command signal, outputs, as the PWM frequency control signal when the first PWM frequency command signal is received, a high-PWM frequency command signal for causing the PWM frequency control unit to control the PWM frequency such that an asynchronous PWM control is performed at the PWM frequency of a predetermined constant frequency, and outputs, as the PWM frequency control signal when the second PWM frequency command signal is received, a low-PWM frequency command signal for causing the PWM frequency control unit to control the PWM frequency such that an asynchronous PWM control or a synchronous PWM control is performed at the PWM frequency in a frequency range lower than the predetermined constant frequency, and the PWM frequency control unit controls the PWM frequency such that an asynchronous PWM control is performed if the motor has a rotational speed less than a predetermined rotational speed and that a synchronous PWM control is performed if the motor has a rotational speed greater than the predetermined rotational speed, when the low-PWM frequency command signal is input as the PWM frequency control signal.

2. The aircraft motor drive control apparatus according to claim 1, wherein the command signal processing unit:

receives, as the PWM frequency command signal, one of the first PWM frequency command signal, the second PWM frequency command signal, and a third PWM frequency command signal that commands that the PWM frequency control signal be determined in the command signal processing unit, outputs the high-PWM frequency command signal as the PWM frequency control signal if a speed change rate value, which is a value indicating a degree of change in the speed command signal, is greater than or equal to a predetermined determination value and outputs the low-PWM frequency command signal as the PWM frequency control signal if the speed change rate value is less than the predetermined determination value, when the third PWM frequency command signal is received.

3. An aircraft motor drive control system comprising: the aircraft motor drive control apparatus according to claim 1; and the controller provided as a flight controller for controlling a control surface of an aircraft.

* * * * *